United States Patent
Lim et al.

(10) Patent No.: US 11,852,527 B2
(45) Date of Patent: Dec. 26, 2023

(54) DEFENSE CIRCUIT OF SEMICONDUCTOR DEVICE AND SEMICONDUCTOR DEVICE INCLUDING THE SAME

(71) Applicant: SAMSUNG ELECTRONICS CO., LTD., Suwon-si (KR)

(72) Inventors: Cheolhwan Lim, Suwon-si (KR); Kwangho Kim, Yongin-si (KR); Donghun Heo, Hwaseong-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 797 days.

(21) Appl. No.: 16/995,925

(22) Filed: Aug. 18, 2020

(65) Prior Publication Data
US 2021/0210439 A1 Jul. 8, 2021

(30) Foreign Application Priority Data
Jan. 7, 2020 (KR) .................. 10-2020-0001864

(51) Int. Cl.
*G01J 1/44* (2006.01)
*G06F 21/87* (2013.01)
*G06F 21/71* (2013.01)
*G01J 1/02* (2006.01)
*H01L 23/00* (2006.01)

(52) U.S. Cl.
CPC .............. *G01J 1/44* (2013.01); *G01J 1/0252* (2013.01); *G06F 21/71* (2013.01); *G06F 21/87* (2013.01); *G01J 2001/446* (2013.01); *H01L 23/576* (2013.01)

(58) Field of Classification Search
CPC ........... G01J 1/44; G01J 1/0252; G06F 21/71; G06F 21/87
See application file for complete search history.

(56) References Cited

U.S. PATENT DOCUMENTS

| | | | |
|---|---|---|---|
| 4,818,883 A * | 4/1989 | Anderson | G01N 21/76 250/361 C |
| 7,473,958 B2 | 1/2009 | Wagner et al. | |
| 7,813,175 B2 | 10/2010 | Kim | |
| 8,089,285 B2 | 1/2012 | Hsu et al. | |
| 8,907,452 B2 | 12/2014 | Marinet et al. | |
| 9,148,094 B1 | 9/2015 | Swoboda | |
| 9,552,499 B2 | 1/2017 | Weder et al. | |
| 10,013,013 B1 * | 7/2018 | Wortel | H03F 3/45475 |
| 10,395,705 B2 | 8/2019 | Rathfelder | |

(Continued)

*Primary Examiner* — Scott Bauer
(74) *Attorney, Agent, or Firm* — F. Chau & Associates, LLC

(57) ABSTRACT

A semiconductor device includes a sensing circuit including a first semiconductor element configured to generate a first current in response to externally incident light, a compensation circuit including a semiconductor element configured to generate a second current depending on an ambient temperature and to remove the second current from the first current to generate a third current, a detection circuit configured to convert the third current into a photovoltage and to compare the photovoltage with a predetermined reference voltage to determine whether an external attack has occurred, and a defense circuit configured to control the semiconductor device to perform a predetermined defense operation, based on a result of the determination.

20 Claims, 12 Drawing Sheets

(56) References Cited

U.S. PATENT DOCUMENTS

| | | |
|---|---|---|
| 2002/0130248 A1 | 9/2002 | Bretschneider et al. |
| 2007/0213946 A1* | 9/2007 | Saether ............ G01R 19/16538 702/57 |
| 2010/0225380 A1 | 9/2010 | Hsu et al. |
| 2014/0015509 A1* | 1/2014 | Gupta ....................... G05F 3/30 323/313 |
| 2015/0042386 A1* | 2/2015 | Bhowmik ............ H03K 17/223 327/143 |
| 2015/0135340 A1 | 5/2015 | Weder et al. |
| 2018/0266879 A1 | 9/2018 | Lee et al. |

\* cited by examiner

DEFENSE CIRCUIT OF SEMICONDUCTOR DEVICE AND SEMICONDUCTOR DEVICE INCLUDING THE SAME

CROSS-REFERENCE TO RELATED APPLICATION

This application claims priority under 35 U.S.C. § 119 to Korean Patent Application No. 10-2020-0001864, filed on Jan. 7, 2020 in the Korean Intellectual Property Office, the disclosure of which is incorporated by reference herein in its entirety.

TECHNICAL FIELD

Exemplary embodiments of the inventive concept relate to a defense circuit of a semiconductor device and a semiconductor device including the defense circuit.

DISCUSSION OF RELATED ART

Physical attacks for extracting data from a semiconductor device may be classified into non-invasive attacks, semi-invasive attacks, and invasive attacks, depending on whether the semiconductor device is damaged. An invasive attack refers to an attack method of directly observing and analyzing the inside of a semiconductor device. Representative examples of an invasive attack are a de-packaging attack, a probing attack, or the like. An invasive attack is a significantly powerful attack method to directly access a circuit element, a metal wiring, or the like, inside of a semiconductor device.

SUMMARY

According to an exemplary embodiment of the inventive concept, a semiconductor device includes a sensing circuit including a first semiconductor element configured to generate a first current in response to externally incident light, a compensation circuit including a second semiconductor element configured to generate a second current, depending on an ambient temperature, and to remove the second current from the first current to generate a third current, a detection circuit configured to convert the third current into a photovoltage and to compare the photovoltage with a predetermined reference voltage to determine whether an external attack has occurred, and a defense circuit configured to control the semiconductor device to perform a predetermined defense operation, based on a result of the determination.

According to an exemplary embodiment of the inventive concept, a defense circuit of a semiconductor device includes a first diode connected to a first node, a second diode connected to a second node, an input resistor connected between a power supply node configured to supply a power supply voltage and the second node, a first operational amplifier having the first node as an inverting input node and the second node as a non-inverting input node, and a second operational amplifier having an output node of the first operational amplifier as a non-inverting input node. The first operational amplifier includes a feedback resistor connected between the first node and the output node of the first operational amplifier.

According to an exemplary embodiment of the inventive concept, a defense circuit of a semiconductor device includes a sensing circuit including a first semiconductor element configured to generate a first current based on externally incident light and an ambient temperature, a compensation circuit configured to remove current depending on the ambient temperature from the first current to generate a second current, a first operational amplifier configured to output a photovoltage corresponding to the second current, and a second operational amplifier configured to compare the photovoltage with a predetermined reference voltage to generate a comparison result, and to output an event signal indicating whether an external attack has occurred based on a comparison result. The compensation circuit includes a second semiconductor element having substantially the same characteristics as the first semiconductor element and is disposed adjacent to the first semiconductor element. A level of a reverse bias voltage applied to the first semiconductor element is substantially the same as a level of a reverse bias voltage applied to the second semiconductor element.

According to an exemplary embodiment of the inventive concept, a defense circuit of a semiconductor device includes a detection circuit including a first operational amplifier and a second operational amplifier, a sensing circuit including a first diode, and a compensation circuit including a second diode. The first and second diodes are connected to at least one input node of the first operational amplifier. The second operational amplifier is configured to compare an output of the first operational amplifier with a predetermined reference voltage to generate a comparison result, and to output an event signal indicating whether an external attack has occurred based on the comparison result. The first diode generates photocurrent in response to externally incident light and first leakage current depending on ambient temperature. The second diode only generates second leakage current depending on the ambient temperature. The first and second leakage currents are substantially the same.

BRIEF DESCRIPTION OF DRAWINGS

The above and other aspects and features of the inventive concept will be more clearly understood by describing in detail exemplary embodiments thereof with reference to the accompanying drawings.

DETAILED DESCRIPTION OF THE EMBODIMENTS

Figure 1:
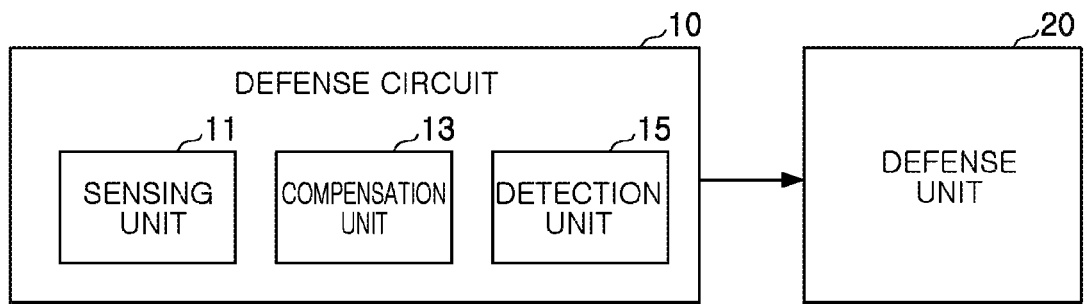
FIG. 1 is a schematic block diagram illustrating a configuration of a semiconductor device according to an exemplary embodiment of the inventive concept.

Exemplary embodiments of the inventive concept provide a defense circuit of a semiconductor device, which may sense externally incident light to accurately detect a physical attack, and a semiconductor device including the defense circuit.

Hereinafter, exemplary embodiments of the inventive concept will be described with reference to the accompanying drawings. Like reference numerals may refer to like elements throughout this application.

FIG. 1 is a schematic block diagram illustrating a configuration of a semiconductor device according to an exemplary embodiment of the inventive concept.

Referring to FIG. 1, a semiconductor device 1 according to an exemplary embodiment of the inventive concept may include a defense circuit 10 and a defense unit 20. The defense unit 20 may also be a circuit.

The defense circuit 10 may sense light, incident inwardly of (or towards) a semiconductor chip, to detect a physical attack on the semiconductor chip. In exemplary embodiments of the inventive concept, the physical attack may include a case in which packaging is damaged by a de-packaging attack on a semiconductor chip or other abnormal situations.

The defense circuit 10 may include a sensing unit 11, a compensation unit 13, and a detection unit 15. According to an exemplary embodiment of the inventive concept, the sensing unit 11, the compensation unit 13, and the detection unit 15 may be circuits.

The sensing unit 11 may generate a photocurrent in response to light incident inwardly of the semiconductor chip. The sensing unit 11 may include a photosensitive device such as a photodiode, a phototransistor, or the like.

A semiconductor device may operate at a significantly high temperature according to a system environment, an operating condition, or the like. For example, since an electronic control unit (ECU) of a vehicle is disposed adjacent to an engine to be thermally connected to various engine components, the ECU generally operates at a high temperature. The sensing unit 11, included in a high-temperature ECU, may generate a predetermined leakage current depending on (or due to) an ambient temperature even when external light does not penetrate therethrough. The generation of such leakage current may significantly reduce physical attack detection accuracy of the defense circuit 10. To address such an issue, the compensation unit 13 may remove the leakage current depending on the ambient temperature generated by the sensing unit 11.

In exemplary embodiments of the inventive concept, the compensation unit 13 may be implemented using the same semiconductor element as the sensing unit 11. For example, the compensation unit 13 may include a photosensitive element such as a photodiode, a phototransistor, or the like. Unlike the sensing unit 11, the compensation unit 13 may be optically shielded to not receive externally incident light. Accordingly, the compensation unit 13 may generate only leakage current depending on the ambient temperature, and may compensate for the leakage current, generated by the sensing unit 11, using the generated leakage current. In other words, the sensing unit 11 generates a first current (e.g., current including a first leakage current), and the compensation unit 13 generates a second current (e.g., a second leakage current). The first and second leakage currents (the leakage current) may be substantially the same. The compensation unit 13 performs compensation by removing the second current from the first current to generate a third current (e.g., the photocurrent that excludes the leakage current).

The detection unit 15 may convert the photocurrent, generated by the sensing unit 11 and the compensation unit 13, into an optical voltage, and may compare the optical voltage with a predetermined reference voltage to determine whether a physical attack has occurred on a semiconductor chip. For example, when the converted optical voltage is higher than or equal to a predetermined reference voltage, the detection unit 15 may output an event signal indicating occurrence of the physical attack on the semiconductor chip. Meanwhile, when the converted optical voltage is lower than the predetermined reference voltage, the detector 15 may output an event signal indicating non-occurrence of the physical attack on the semiconductor chip. In exemplary embodiments of the inventive concept, the event signal may be a voltage signal having a logic high level when the physical attack has occurred on the semiconductor chip, and may be a voltage signal having a logic low level when the physical attack has not occurred on the semiconductor chip.

The defense unit 20 may control the semiconductor device to perform a predetermined defense operation when the physical attack has occurred on the semiconductor chip. For example, the defense unit 20 may control the semiconductor device to perform operations such as data initialization, data scrambling, data output blocking, or the like when an event signal indicating the occurrence of the physical attack is received from the defense circuit 10.

The defense unit 20 may be included in a specific semiconductor chip to be protected with the defense circuit 10. In addition, the defense circuit 10 may be included in a specific semiconductor chip to be protected, and the defense unit 20 may be included in another semiconductor chip, for example, an application processor (AP). In other words, the defense circuit 10 including the sensing unit 11, the compensation unit 13, and the detection unit 15 may be included in a first semiconductor chip, the defense unit 20 may be included in a second semiconductor chip, and the first and second semiconductor chips are separate.

Figure 2:
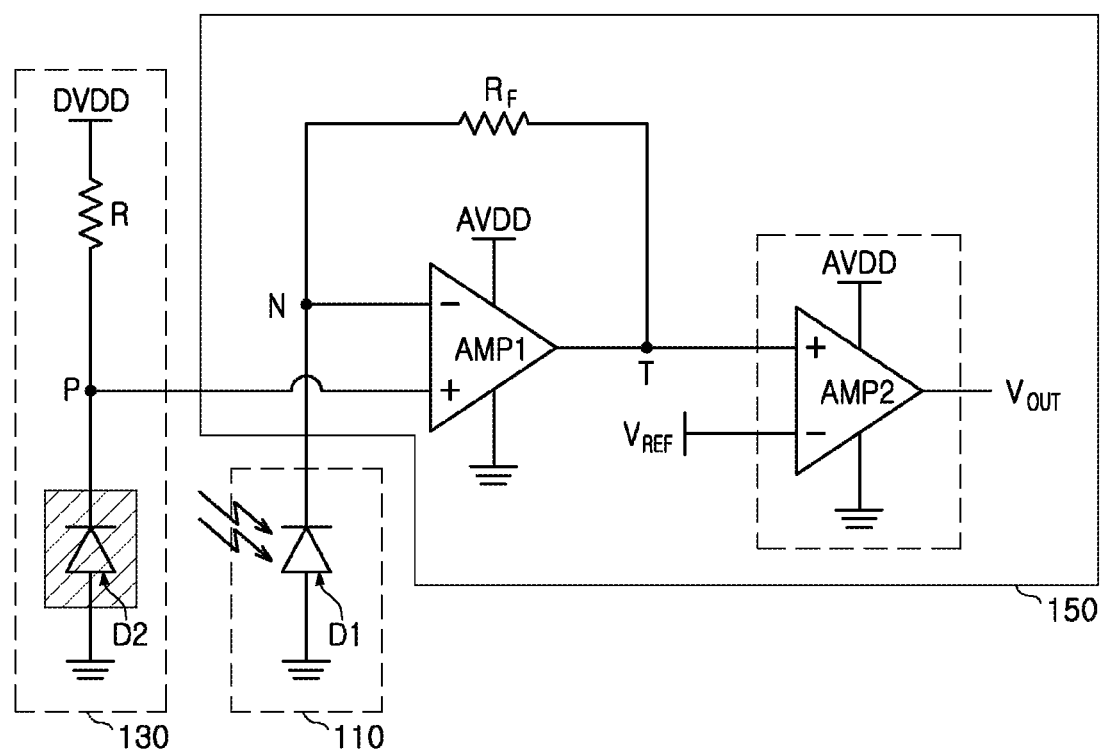
FIG. 2 is a circuit diagram of a defense circuit according to an exemplary embodiment of the inventive concept.
Figure 3A:
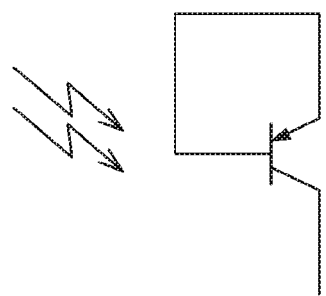
FIGS. 3A and 3B are circuit diagrams illustrating a sensing unit of FIG. 2 according to exemplary embodiments of the inventive concept.
Figure 3B:
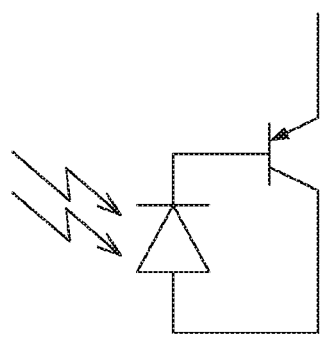

FIG. 2 is a circuit diagram of a defense circuit according to an exemplary embodiment of the inventive concept. FIGS. 3A and 3B are circuit diagrams illustrating a sensing unit in FIG. 2 according to exemplary embodiments of the inventive concept.

Referring to FIG. 2, a defense circuit 100 according to an exemplary embodiment of the inventive concept may include a sensing unit 110, a compensation unit 130, and a detection unit 150 including a first operational amplifier AMP1 and a second operational amplifier AMP2.

The sensing unit 110 may have a first diode D1 connected between an inverting input node N (e.g., a first node) of the first operational amplifier AMP1 and a second power supply node for supplying a second power supply voltage, for example, a grounding node.

The first diode D1 may include at least one photosensitive element generating a photocurrent in response to incident light. In exemplary embodiments of the inventive concept, the photosensitive element may be a photodiode. Alternatively, as illustrated in FIG. 3A, the photosensitive element may be a phototransistor. Alternatively, as illustrated in FIG. 3B, the photosensitive element may be a combination of a transistor and a photodiode.

A level of a first reverse bias voltage $V_N$, applied to the first diode D1, may vary depending on an ambient temperature of the defense circuit 100. For example, as the ambient temperature is increased, the first diode D1 may generate more leakage current, and the first reverse bias voltage $V_N$ may be increased or decreased in inverse proportion to the amount of generated leakage current.

The compensation unit 130 may include an input resistor R connected between a first power node for supplying a first power supply voltage DVDD and a non-inverting input node P (e.g., a second node) of the first operational amplifier AMP1, and a second diode D2 connected between the non-inverting input node P of the first operational amplifier AMP1 and the second power supply voltage node, for example, a grounding node.

The second diode D2 may have substantially the same current-voltage characteristics as the first diode Dl. In addition, the second diode D2 may be disposed adjacent to the first diode D1. Therefore, the magnitude of leakage current, generated by the first diode D1 based on the ambient temperature, may be substantially the same as the magnitude of the leakage current generated by the second diode D2.

Unlike the first diode D1, the second diode D2 may allow incident light to be blocked by a light shielding film such as a metal. Therefore, unlike the first diode D1, the second diode D2 may generate only leakage current depending on the ambient temperature.

A second reverse bias voltage $V_P$, applied to the second diode D2, may be determined by the first power supply voltage DVDD and an input resistance of the input resistor R. The higher the second reverse bias voltage $V_P$, the more amount of current may be generated by the second diode D2 from the same number of electron-hole pairs. As a result, the compensation unit 130 may be increased in sensitivity to a change in the ambient temperature, to detect the amount of leakage current more accurately. Accordingly, in exemplary embodiments of the inventive concept, the first power supply voltage DVDD may have a maximum level at which the first power supply voltage DVDD may be applied to the second diode D2.

A level of the second reverse bias voltage $V_P$ may vary depending on the ambient temperature. For example, the level of the second reverse bias voltage $V_P$ may be increased or decreased in inverse proportion to the amount of leakage current generated by the first diode D1 depending on the ambient temperature.

The first operational amplifier AMP1 may convert the photocurrent, generated by the first diode D1, into an output voltage $V_T$ at an output node T. In exemplary embodiments of the inventive concept, an operating voltage AVDD of the first operational amplifier AMP1 may have a magnitude greater than a magnitude of the first power supply voltage DVDD.

A feedback resistor $R_F$ may be connected between the output node T and the non-inverting input node N of the first operational amplifier AMP1. In exemplary embodiments of the inventive concept, the feedback resistor $R_F$ may have substantially the same magnitude as the input resistor R. In addition, the leakage current, generated by the first diode D1, may have substantially the same magnitude as the leakage current generated by the second diode D2. Therefore, the first reverse bias voltage $V_N$ may maintain substantially the same level as the second reverse bias voltage $V_P$ in spite of a change in the ambient temperature. As a result, since an influence of the change in the ambient temperature on the output voltage $V_T$ of the first operational amplifier AMP1 may be eliminated, the defense circuit 100 may more accurately sense externally incident light to determine whether an external attack has occurred.

The second operational amplifier AMP2 may receive the output voltage $V_T$ of the first operational amplifier AMP1 through a non-inverting input terminal, and may receive a predetermined reference voltage $V_{REF}$ through an inverting input terminal. The second operational amplifier AMP2 may compare the output voltage $V_T$ of the first operational amplifier AMP1 with the predetermined reference voltage $V_{REF}$ to output a comparison result $V_{OUT}$.

The reference voltage $V_{REF}$ may be set to an appropriate value to prevent an unnecessary protection operation from being performed by dark current, which may be temporarily generated in a normal operation of the semiconductor chip, by inspection light incident in a testing process of a semiconductor chip, or the like.

When sizes of the first diode D1, the second diode D2, the input resistance R, and the feedback resistor $R_F$ are decreased to decrease a size of the defense circuit 100, light detection sensitivity of the defense circuit 100 may be reduced. To prevent this, in exemplary embodiments of the inventive concept, the reference voltage $V_{REF}$ may be set to a relatively low value. Thus, the defense circuit 100 may accurately detect a physical attack even when a photodiode manufactured by a typical CMOS process is used as the first diode Dl.

FIGS. 4A to 4D are cross-sectional views illustrating an arrangement relationship between a first diode and a second diode in FIG. 2 according to exemplary embodiments of the inventive concept.

Figure 4A:
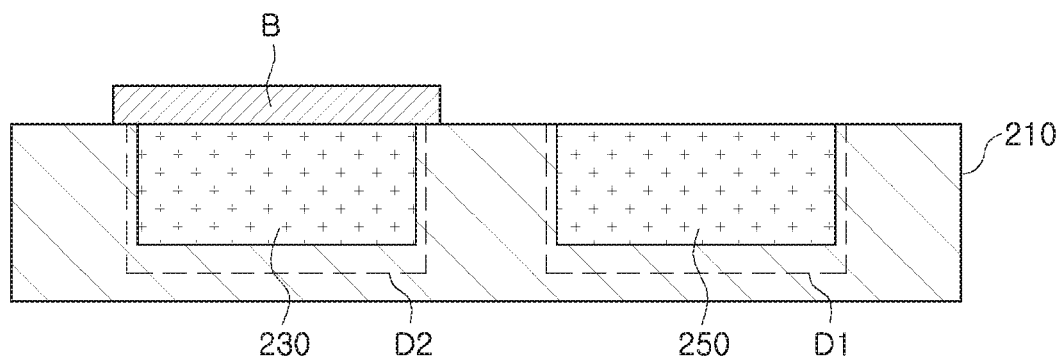
FIGS. 4A to 4D are cross-sectional views illustrating an arrangement relationship between a first diode and a second diode in FIG. 2 according to exemplary embodiments of the inventive concept.

Referring first to FIG. 4A, the first diode D1 and the second diode D2 according to an exemplary embodiment of the inventive concept may be disposed to be adjacent to each other.

The first diode D1 may be formed by implanting an N-type first semiconductor material 230 into a P-type semiconductor substrate 210. The second diode D2 may be formed by implanting an N-type second semiconductor material 250, adjacent to the first semiconductor material 230, into the semiconductor substrate 210. In exemplary embodiments of the inventive concept, the first semiconductor material 230 and the second semiconductor material 250 may be implanted with substantially the same doping concentration and substantially the same size.

The first diode D1 may generate a photocurrent in response to incident light. Meanwhile, the second diode D2 cannot generate a photocurrent because a light shielding film B formed of a metal, or the like, is disposed on the second diode D2.

However, since the first diode D1 and the second diode D2 are formed of the same material and with substantially the same size in regions adjacent to each other, characteristics thereof may be substantially the same. Therefore, the amount of leakage current generated by the first diode D1 based on the ambient temperature may be substantially the same as the amount of leakage current generated by the second diode D2. A defense circuit according to an exemplary embodiment of the inventive concept may offset an influence of the leakage current, generated by the first diode D1, using the leakage current, generated by the second diode D2, to more accurately detect whether an external attack has occurred.

Figure 4B:
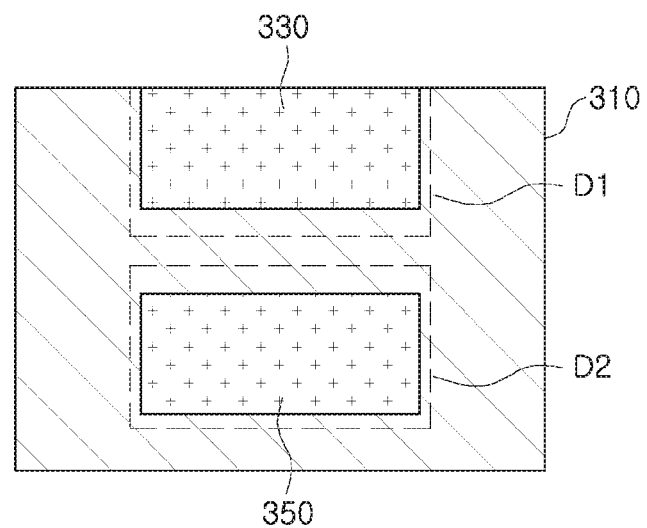

Referring to FIG. 4B, the first diode D1 may be formed by implanting an N-type first semiconductor material 330 into a P-type semiconductor substrate 310. The second diode D2 may be formed by implanting an N-type second semiconductor material 350 into a lower portion of the first diode D1. In exemplary embodiments of the inventive concept, the first semiconductor material 330 and the second semiconductor material 350 may be implanted with the same doping concentration and substantially the same size. Unlike FIG. 4A, as the second diode D2 is disposed below the first diode D1, light incident on the second diode D2 may be effectively blocked by the first diode D1. Accordingly, an additional light shielding film for blocking light incident on the second diode D2 may not be required.

Figure 4C:
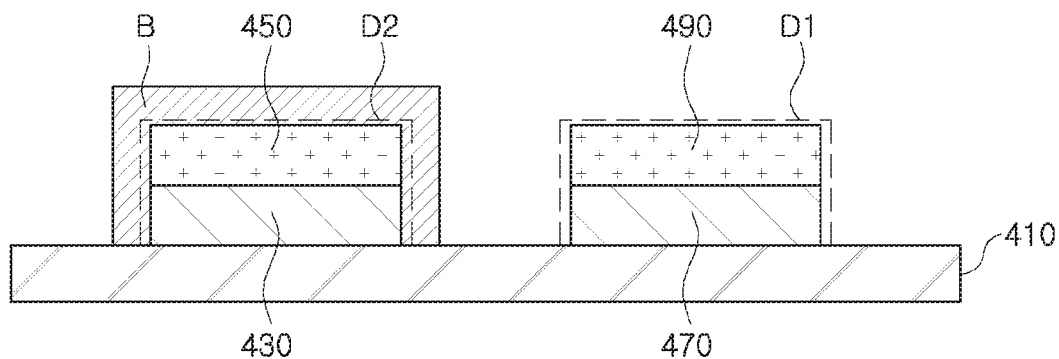

Referring to FIG. 4C, the first diode D1 and the second diode D2 may be formed using P-type semiconductor material layers 470 and 430, respectively, and N-type semiconductor material layers 490 and 450, respectively, sequentially disposed on a semiconductor substrate 410. The second diode D2 may be disposed adjacent to the first diode D1 on the semiconductor substrate 410, and the light shielding film B surrounding the second diode D2 may be formed to block incident light. The light shielding film B may surround the P-type semiconductor material layer 430 and the N-type semiconductor material layer 450 of the second diode D2.

Figure 4D:
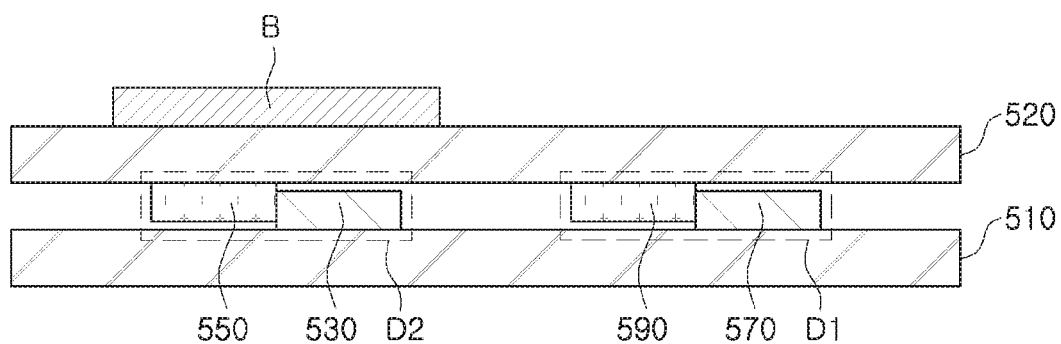

Referring to FIG. 4D, the first diode D1 and the second diode D2 may be formed using P-type semiconductor material layers 570 and 530, respectively, disposed on a first surface of a first substrate 510, and N-type semiconductor material layers 590 and 550, respectively, disposed on a first surface of a second substrate 520. The first surface of the first substrate 510 may face the first surface of the second substrate 520. An empty space between the first surface of the first substrate 510 and the first surface of the second substrate 520 may be filled with an insulating material such as silicon oxide. The light shielding film B may be disposed on a region in which light is incident from the outside to block the incident light. For example, the light shielding film B may be disposed on a second surface of the second substrate 520, opposite to the first surface of the second substrate 520, to block light incident onto the second diode D2. In other words, externally incident light is blocked from reaching the second diode D2.

Figure 5:
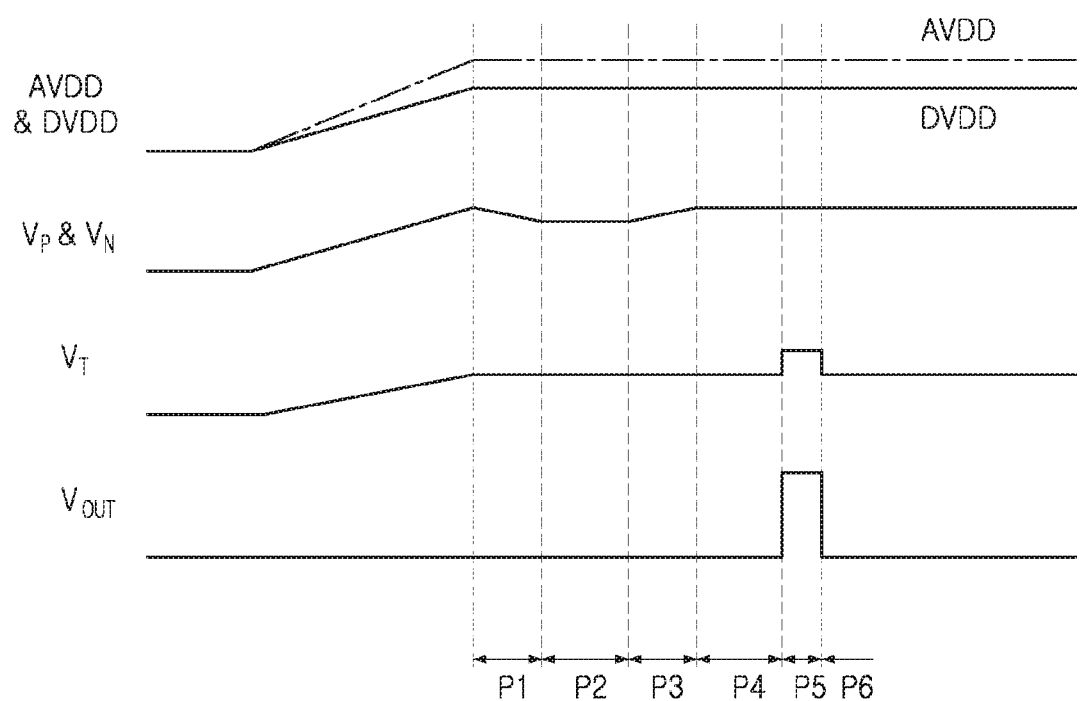
FIG. 5 is a timing diagram illustrating a method of operating a defense circuit according to an exemplary embodiment of the inventive concept.

FIG. 5 is a timing diagram illustrating a method of operating a defense circuit according to an exemplary embodiment of the inventive concept.

Referring to both FIG. 5 and FIG. 2 for ease of description, the operating voltage AVDD of the first operational amplifier AMP1 may have a level higher than a level of the first power supply voltage DVDD.

As the first power supply voltage DVDD is applied, the second reverse bias voltage $V_P$ may be applied to the second diode D2.

As the ambient temperature of the defense circuit 100 is changed during first to third periods P1 to P3, the second reverse bias voltage $V_P$ and the first reverse bias voltage $V_N$ may be changed in inverse proportion to the change in the ambient temperature. For example, the first reverse bias voltage $V_N$ and the second reverse bias voltage $V_P$ may be decreased during the first period P1 in which the ambient temperature is increased. In contrast, the first reverse bias voltage $V_N$ and the second reverse bias voltage $V_P$ may be increased during the third period P3 in which an operating temperature of the defense circuit 100 is decreased. However, since the first diode D1 and the second diode D2 have substantially the same characteristics and the feedback resistor $R_F$ and the input resistor R have substantially the same resistance, the first reverse bias voltage $V_N$ and the second reverse bias voltage $V_P$ may be maintained at substantially the same level.

Since the first reverse bias voltage $V_N$ and the second reverse bias voltage $V_P$ are maintained at substantially the same level, leakage currents, respectively generated by the first diode D1 and the second diode D2, may offset each other due to a change in ambient temperature. Thus, the output voltage $V_T$ of the first operational amplifier AMP1 and the comparison result (or output) $V_{OUT}$ of the second operational amplifier AMP2 may be constantly maintained during first to fourth periods P1 to P4 in which external light does not penetrate therethrough.

During a fifth period P5, light may penetrate into packaging of the semiconductor chip. In this case, the first diode D1 may generate a photocurrent in response to the penetrating light, and the first operational amplifier AMP1 may convert the photocurrent, generated by the first diode D1, into the output voltage $V_T$ (or a photovoltage $V_T$) to output.

The second operational amplifier AMP2 may compare the photovoltage $V_T$, output by the first operational amplifier AMP, with the predetermined reference voltage $V_{REF}$, and may output the comparison result $V_{OUT}$. In exemplary embodiments of the inventive concept, when the photovoltage $V_T$ output from the first operational amplifier AMP is higher than or equal to the predetermined reference voltage $V_{REF}$, the second operational amplifier AMP2 may output the comparison result $V_{OUT}$ having a logic high level. In contrast, when the photovoltage $V_T$ output from the first operational amplifier AMP is lower than the predetermined reference voltage $V_{REF}$, the second operational amplifier AMP2 may output the comparison result $V_{OUT}$ having a logic low level. Accordingly, the second operational amplifier AMP2 may output the comparison result $V_{OUT}$ having a logic high level during the fifth period P5, in which light penetrates into the packaging of the semiconductor chip.

Figure 6:
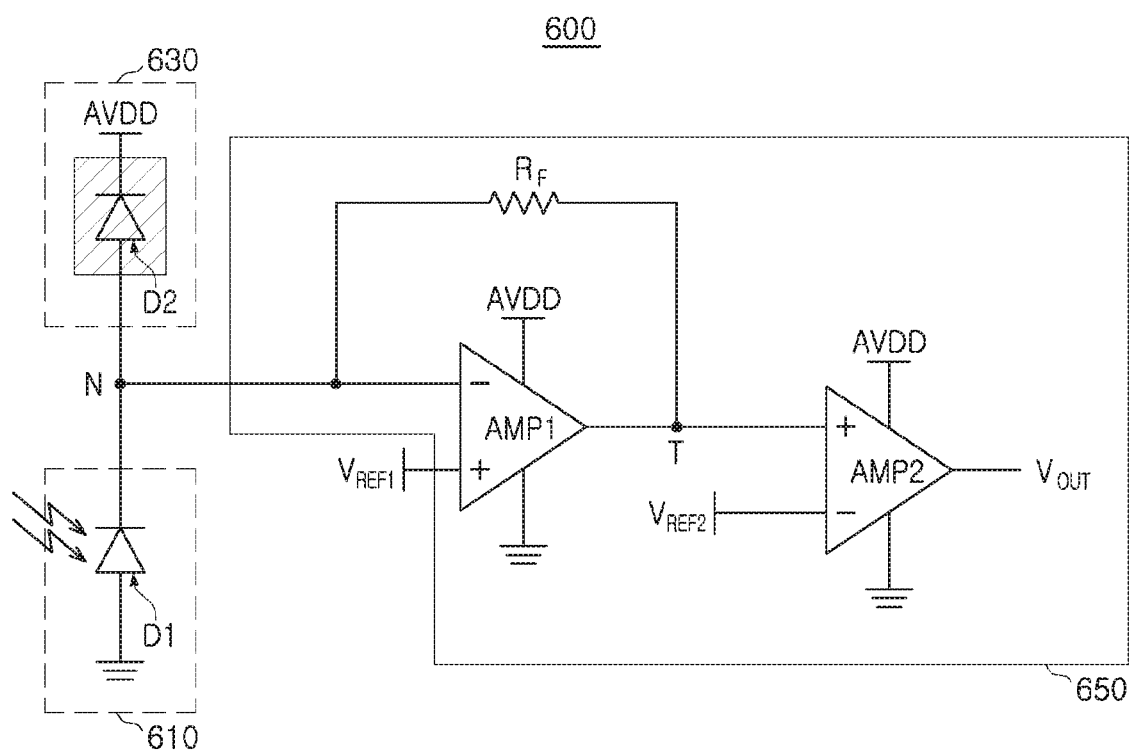
FIG. 6 is a circuit diagram of a defense circuit according to an exemplary embodiment of the inventive concept.

FIG. 6 is a circuit diagram of a defense circuit according to an exemplary embodiment of the inventive concept.

Configurations similar to that of the defense circuit 100, described with reference to FIG. 2, will not be described or will be simply described.

Referring to FIG. 6, a defense circuit 600 according to an exemplary embodiment of the inventive concept may include a sensing unit 610, a compensation unit 630, and a detecting unit 650 including the first operational amplifier AMP1 and the second operational amplifier AMP2.

The sensing unit 610 may include the first diode D1 connected between the inverting input node N of the first operational amplifier AMP1 and a second power supply node for supplying a second power supply voltage, for example, a grounding node.

The first diode D1 may include at least one photodiode sensing incident light to generate a photocurrent. The first diode D1 may be replaced with various photosensitive elements such as a phototransistor, a combination of a transistor and a photodiode, or the like, in addition to a photodiode.

The compensation unit 630 may include the second diode D2 connected between a first power supply node for supplying the first power supply voltage AVDD and the inverting input node N of the first operational amplifier AMP1. In other words, the first diode D1 and the second diode D2 may be commonly connected to the inverting input node N of the first operational amplifier AMP1.

The second diode D2 may include a semiconductor element having substantially the same characteristics as the first diode D1. The second diode D2 may be disposed adjacent to the first diode D1. Unlike the first diode D1, the second diode D2 may be optically shielded by a shielding film such as a metal. As a result, unlike the first diode D1, the second diode D2 may generate only a leakage current depending on an ambient temperature.

Since the first diode D1 and the second diode D2 have substantially the same characteristics and are disposed adjacent to each other, the amount of leakage current generated by the first diode D1 depending on the ambient temperature may be substantially the same as the amount of leakage current generated by the second diode D2 depending on the ambient temperature. Accordingly, the leakage current generated by the first diode D1 and the leakage current generated by the second diode D2 may offset each other. Thus, the voltage $V_N$ on the inverting input node N of the first operational amplifier AMP1 may be constantly maintained irrespective of a change in the ambient temperature. In addition, since the influence of the change in the ambient temperature on the output voltage $V_T$ of the first operational amplifier AMP1 may be eliminated, the defense circuit 600 may more accurately sense externally incident light.

The first operational amplifier AMP1 may convert the photocurrent, generated by the first diode D1, into the photovoltage $V_T$. The feedback resistor $R_F$ may be connected between the output node T and the non-inverting input node N of the first operational amplifier AMP1.

A voltage $V_{REF1}$ on the non-inverting input node of the first operational amplifier AMP1 may be set to an appropriate value which does not saturate the first operational amplifier AMP1 within the range of a preset amplification gain. For example, the voltage $V_{REF1}$ on the non-inverting input node of the first operational amplifier AMP1 may be half of the first power supply voltage AVDD. The voltage $V_{REF1}$ on the non-inverting input node of the first operational amplifier AMP1 may be set to an appropriate value in consideration of the operating voltage AVDD of the first operational amplifier AMP1, power consumption, or the like. For example, when the operating voltage AVDD of the first operational amplifier AMP1 is relatively low, the voltage $V_{REF1}$ in the non-inverting input node of the first operational amplifier AMP1 may be set to a relatively high value to increase the magnitude of the output voltage $V_T$. In addition, the voltage $V_{REF1}$ on the non-inverting input node of the first operational amplifier AMP1 may be set to a relatively low value to significantly reduce the power consumption of the defense circuit 600. The voltage $V_{REF1}$ on the non-inverting input node of the first operational amplifier AMP1 may be adjusted to an appropriate value under the control of an external circuit during operation of the defense circuit 600.

The second operational amplifier AMP2 may receive the output voltage $V_T$ of the first operational amplifier AMP1 through the non-inverting input node, and may receive a predetermined reference voltage $V_{REF2}$ through the inverting input terminal. The second operational amplifier AMP2 may compare the output voltage $V_T$ of the first operational amplifier AMP1 with the predetermined reference voltage $V_{REF2}$ to output the comparison result $V_{OUT}$.

The reference voltage $V_{REF2}$ may be set to an appropriate value to prevent an unnecessary protection operation from being performed by dark current, which may be temporarily generated in a normal operation of the semiconductor chip, by inspection light incident in a testing process of the semiconductor chip, or the like. When sizes of the first diode D1, the second diode D2, and the feedback resistor $R_F$ need to be decreased, the predetermined reference voltage $V_{REF2}$ may be set to be a relatively low value to prevent light detection sensitivity of the defense circuit 600 from being reduced.

FIGS. 7A to 8B are perspective views illustrating an arrangement of a defense circuit according to exemplary embodiments of the inventive concept.

Figure 7A:
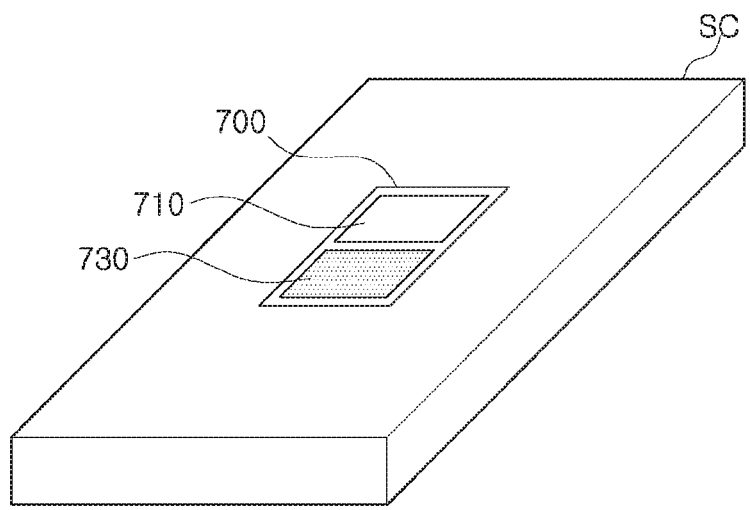
FIGS. 7A to 8B are perspective views illustrating an arrangement of a defense circuit according to exemplary embodiments of the inventive concept.
Figure 7B:
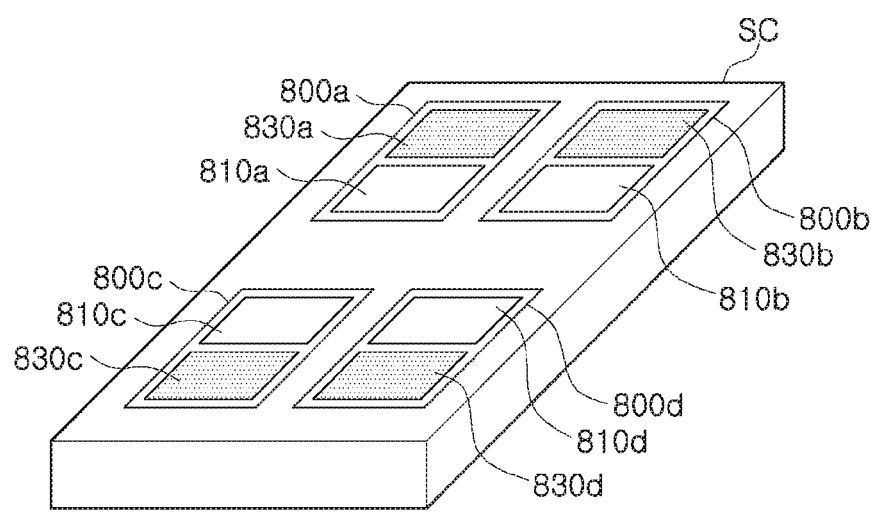

Referring to FIG. 7A, a defense circuit 700 according to an exemplary embodiment of the inventive concept may be implemented as a single module, including a photocurrent generation unit 710 and a detection unit 730, to be disposed in one region of a semiconductor chip SC.

The photocurrent generation unit 710 may include a sensing unit generating a photocurrent in response to light penetrating into packaging of the semiconductor chip SC, and a compensation unit removing leakage current depending on an ambient temperature or the like. The details of the elements are the same as described above with reference to FIGS. 1 to 6.

In exemplary embodiments of the inventive concept, the photocurrent generation unit 710 may be disposed in a region in which light, penetrating into the packaging of the semiconductor chip SC, may be better received.

The detection unit 730 may convert the photocurrent, generated by the photocurrent generation unit 710, into a photovoltage, and may compare the photovoltage with a predetermined reference voltage to detect whether an external attack has occurred.

In FIG. 7A, one defense circuit 700 is illustrated as being disposed on the semiconductor chip SC. However, the number of defense circuits may be variously changed. For example, referring to FIG. 7B, a plurality of defense circuits 800a to 800d may be disposed in different regions of the semiconductor chip SC to more accurately detect whether an external attack has occurred on the semiconductor chip SC. The plurality of defense circuits 800a to 800d may include a plurality of photocurrent generation units 810a to 810d, respectively, and a plurality of detection units 830a to 830d, respectively.

On the other hand, a plurality of photocurrent generation units may share a single detection unit. For example, referring to FIG. 8A, a defense circuit 900 may include a plurality of photocurrent generation units 910a to 910d and a single detection unit 930. The plurality of photocurrent generation units 910a to 910d may be distributed in a plurality of regions of the semiconductor chip SC.

In exemplary embodiments of the inventive concept, the detection unit 930 may obtain an average value from the photocurrents received from the plurality of photocurrent generation units 910a to 910d, and may determine whether an attack has occurred on the semiconductor chip SC, using the obtained average value. To this end, the detection unit 930 may further include an operational unit configured to obtain an average value from the photocurrents received from the plurality of photocurrent generation units 910a to 910d.

In exemplary embodiments of the inventive concept, the detection unit 930 may sequentially process the respective photocurrents, received from the plurality of photocurrent generation units 910a to 910d, to determine whether an external attack has occurred on the semiconductor chip SC. To this end, the detection unit 930 may further include a first-in first-out (FIFO) buffer configured to sequentially process the respective photocurrents received from the plurality of photocurrent generation units 910a to 910d.

Figure 8A:
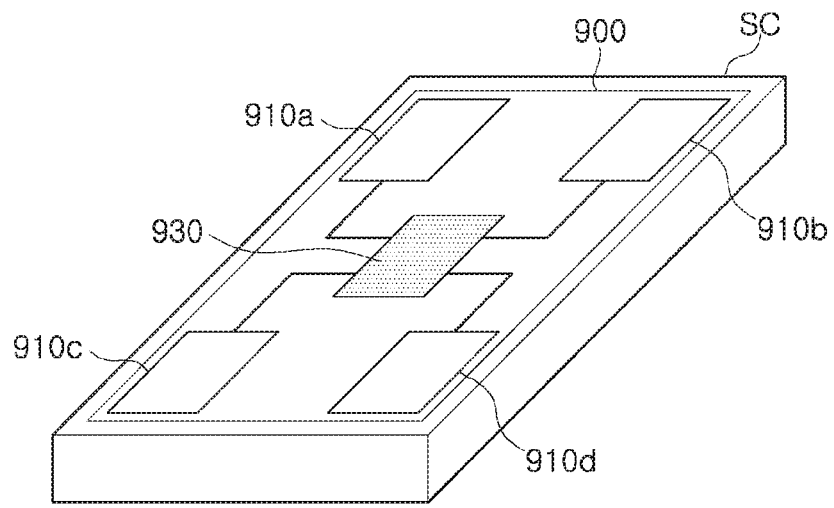
Figure 8B:
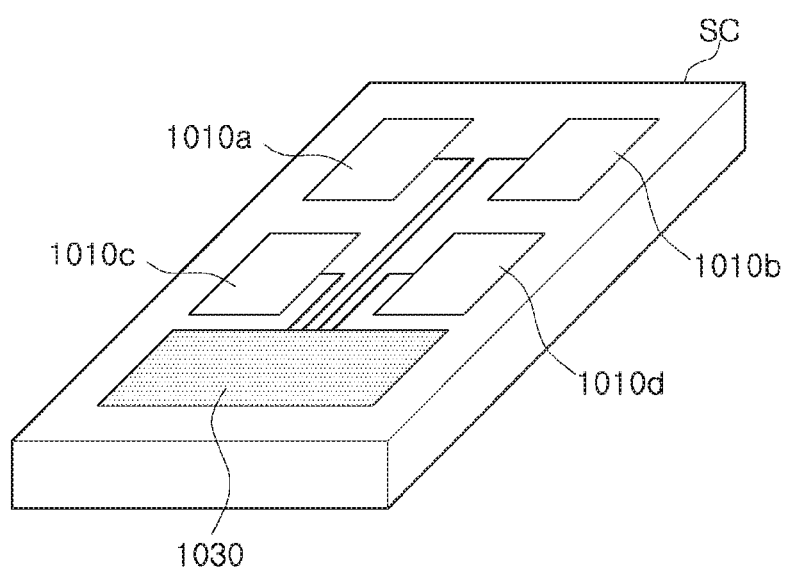

The arrangement of the plurality of photocurrent generation units 910a to 910d and the detection unit 930 may be changed in various ways. For example, the detection unit 930 may be disposed in the center of the plurality of photocurrent generation units 910a to 910d to significantly reduce a routing length between the plurality of photocurrent generation units 910a to 910d and the detection unit 930. Alternatively, as illustrated in FIG. 8B, a plurality of photocurrent generation units 1010a to 1010d may be densely disposed in a region, in which a de-packaging attack has occurred more easily, to more accurately detect a physical attack on the semiconductor chip SC, using a detection unit 1030.

Figure 9:
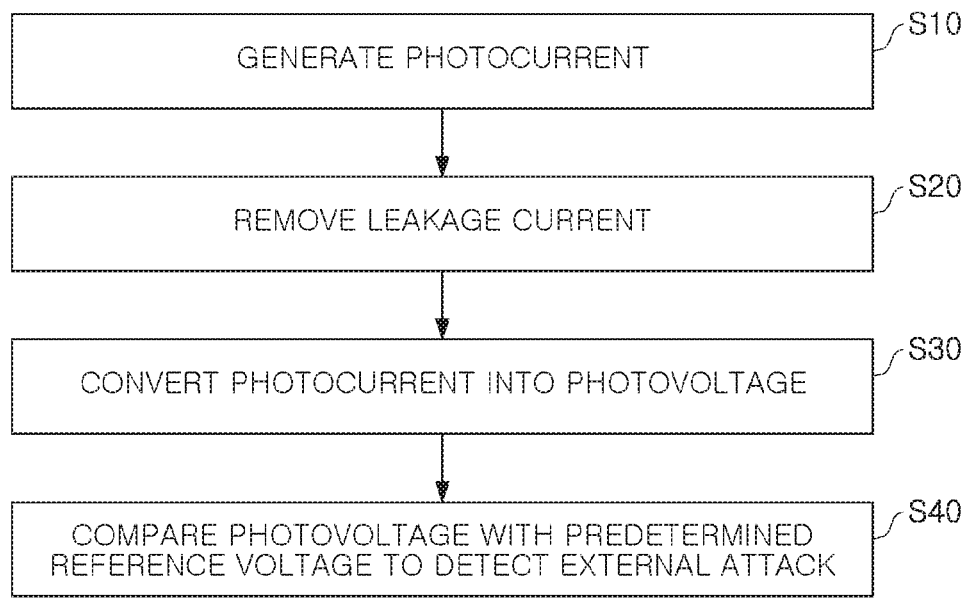
FIG. 9 is a flowchart illustrating a method of operating a defense circuit according to an exemplary embodiment of the inventive concept.

FIG. 9 is a flowchart illustrating a method of operating a defense circuit according to an exemplary embodiment of the inventive concept.

Referring to both FIG. 9 and FIG. 2 for ease of description, a sensing unit may generate a photocurrent in response to light penetrating from the outside of packaging of a semiconductor chip (S10). The sensing unit may include a photosensitive element, for example, a photodiode, a phototransistor, a combination of a photodiode and a junction transistor, or the like.

A compensation unit may remove a leakage current component depending on an ambient temperature from the photocurrent generated by the sensing unit (S20). The compensation unit may include a semiconductor element having substantially the same characteristics as the sensing unit and disposed adjacent thereto. The semiconductor element, included in the compensation unit, may generate only the leakage current depending on the ambient temperature because light is blocked by an optical shielding layer. Since the leakage current generated by the compensation unit may be substantially the same as the leakage current generated by the sensing unit, the leakage currents may offset each other.

The detection unit may convert the photocurrent, generated by the sensing unit and the compensation unit, into a photovoltage (S30).

The detection unit may compare the converted photovoltage with a predetermined reference voltage to determine whether an external attack has occurred on a semiconductor chip (S40). For example, when the converted photovoltage is higher than or equal to the predetermined reference voltage, the detection unit may output an event signal indicating the occurrence of the external attack on the semiconductor chip. In contrast, when the converted photovoltage is lower than the predetermined reference voltage, the detection unit may output an event signal indicating non-occurrence of the external attack on the semiconductor chip.

Figure 10:
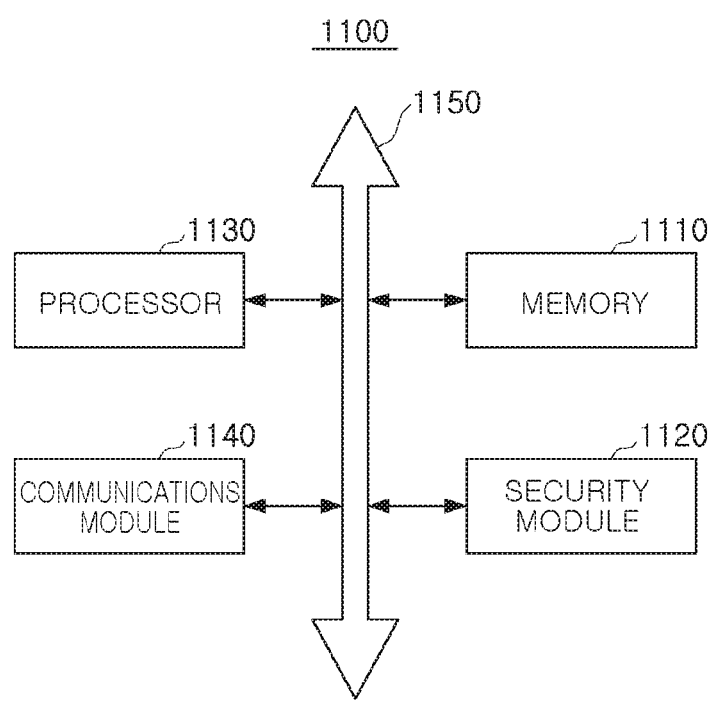
FIG. 10 is a schematic block diagram of an electronic device including a defense circuit according to an exemplary embodiment of the inventive concept.

FIG. 10 is a schematic block diagram of an electronic device including a defense circuit according to an exemplary embodiment of the inventive concept.

Referring to FIG. 10, an electronic device 1100 according to an exemplary embodiment of the inventive concept may include a memory 1110, a security module 1120, a processor 1130, and a communications module 1140.

Among the components illustrated in FIG. 10, the communications module 1140 may be a device provided for the electronic device 1100 to communicate with a video card, sound card, memory card, universal serial bus (USB) device, or the like. The electronic device 1100 may be a device including a smartphone, a tablet personal computer (PC), a smart wearable device, or the like, in addition to a general desktop computer or a laptop computer.

The memory 1100 may be a storage medium storing data for the operation of the electronic device 1100, multimedia data, or the like. The memory 1100 may include a storage device based on a nonvolatile memory. In addition, the memory 1100 may include at least one of a solid-state drive (SSD) a hard disk drive (HDD), or an optical disk drive (ODD), as a storage device.

The processor 1130 may perform specific operations, commands, tasks, or the like. The processor 1130 may be a central processing unit (CPU), a microprocessor unit (MCU), a system on chip (SoC), or the like. Via a bus 1150, the processor 1130 may communicate with not only the memory 1110 and the security module 1120 but also other devices connected to the electronic device 1100 via the communication module 1140.

The security module 1120 may be a semiconductor device including a defense circuit according to exemplary embodiments of the inventive concept described with reference to FIGS. 1 to 9. The security module 1120 may include at least one semiconductor chip for storing confidential information. For example, the security module 1120 may include a memory chip for encrypting and storing an authentication key. The defense circuit may sense light penetrating through the semiconductor chip in the security module 1120 to detect whether a physical attack has occurred.

When a physical attack has occurred on the security module 1120, the security module 1120 may perform a predetermined defense operation such as data initialization, data scrambling, data output blocking, or the like. The defense operation of the security module 1120 may be internally performed based on a detection result of the defense circuit. In addition, the defense operation of the security module 1120 may be performed based on the detection result of the defense circuit under the control of the processor 1130.

Figure 11:
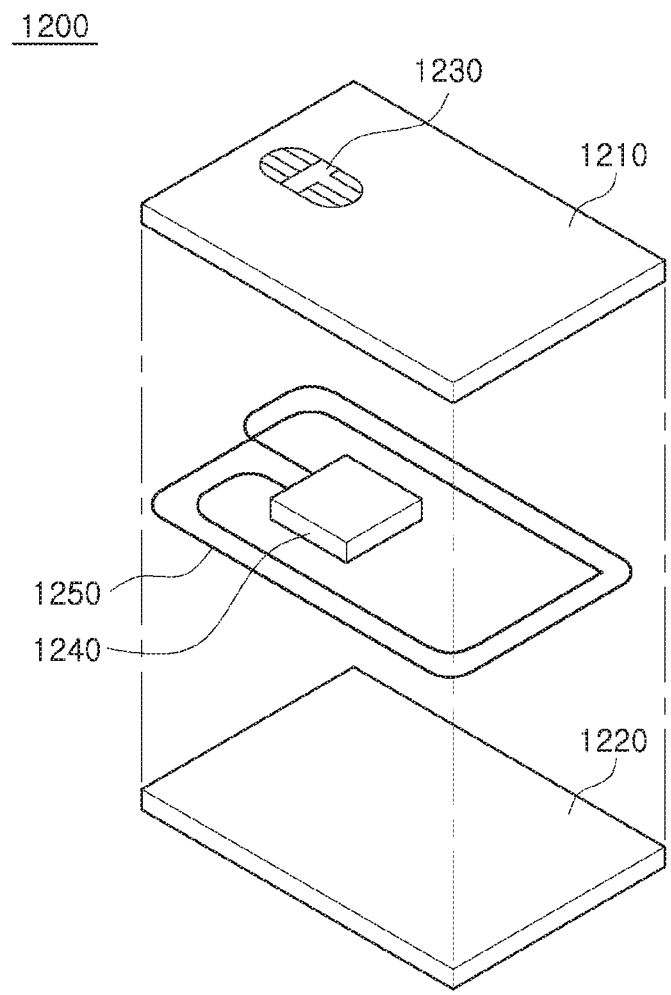
FIG. 11 illustrates a smart card including a defense circuit according to an exemplary embodiment of the inventive concept.

FIG. 11 illustrates a smart card including a defense circuit according to an exemplary embodiment of the inventive concept.

Referring to FIG. 11, a smart card 1200 may include first and second base members 1210 and 1220, a contact portion 1230, an IC circuit 1240, and an antenna 1250.

The first and second base members 1210 and 1220 may be formed of plastic or a similar material to form an exterior of the smart card 1200.

The IC circuit 1240 may be disposed between the first and second base members 1210 and 1220. The IC circuit 1240 may be a smart card chip included in the smart card 1200. The contact portion 1230, including a plurality of pins, may be formed on the first base member 1210. The contact unit 1230 may be an interface in direct contact with an external device, such as a card terminal to exchange data.

The antenna 1250 may be formed as a coil between the first and second base members 1210 and 1220. The antenna 1250 may transmit and receive a wireless signal having a predetermined frequency to and from the external device.

In the IC circuit 1240, a defense circuit according to exemplary embodiments of the inventive concept described with reference to FIGS. 1 to 9 may be formed. The defense circuit may detect light, incident from the outside of the IC circuit 1240, to detect a hacking attempt.

Figure 12:
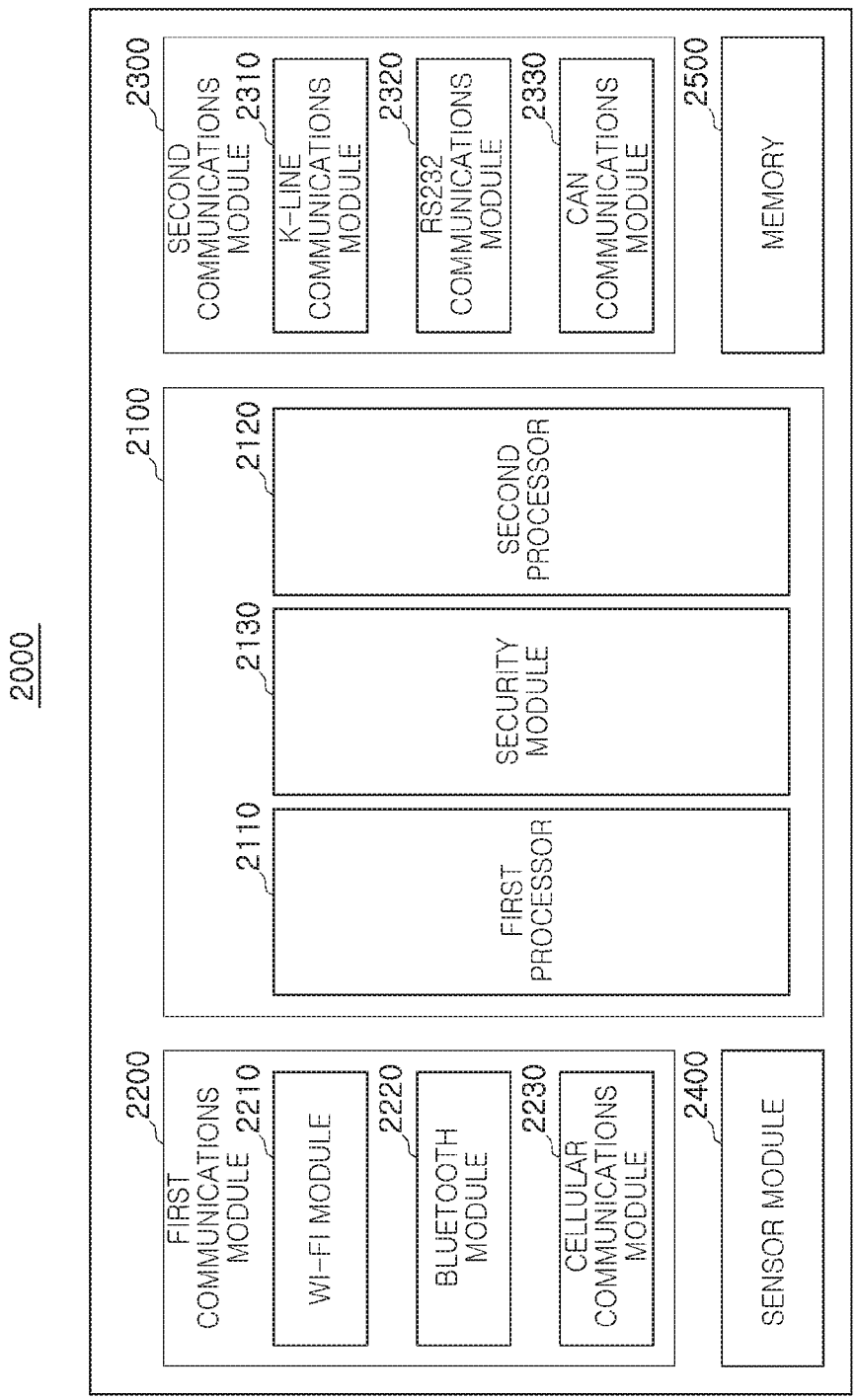
FIG. 12 is a block diagram illustrating a vehicular electronic device including a defense circuit according to an exemplary embodiment of the inventive concept.

FIG. 12 is a block diagram illustrating a vehicular electronic device including a defense circuit according to an exemplary embodiment of the inventive concept.

Referring to FIG. 12, a vehicle system 2000 according to an exemplary embodiment of the inventive concept may include a processor 2100, a first communications module 2200, a second communications module 2300, a sensor module 2400, and a memory 2500.

The processor 2100 may control at least one of the other components of the vehicle system 2000, and may perform various data processing or operations. For example, as a portion of the data processing or operations, the processor 2100 may load a command or data, received from other components into a volatile memory, and may process the command or the data loaded into the volatile memory to store result data in the volatile memory.

The processor 2100 may control the overall operation of the vehicle system 2000. The processor 2100 may include a first processor 2110 and a second processor 2120.

The first processor 2110 may control the operation of the vehicle system 2000 and may include a central processing unit (CPU), an application processor (AP), or the like.

The second processor 2120 may perform a self-diagnosis of a vehicle and may include a micro controller unit (MCU) or the like.

The first processor 2110 and the second processor 2120 may transmit and receive data through a security module 2130. For example, the first processor 2110 may encrypt command data for obtaining status information of the vehicle through the security module 2130, and may transmit the encrypted command data to the second processor 2120. The second processor 2120 may obtain the status information of the vehicle in response to the received encrypted command data, and may encrypt the obtained status information through the security module 2130 and transmit the encrypted status information to the first processor 2110. The security module 2130 may include a command transmission target list and may block the transmission of command data that does not correspond to the command transmission target list.

The security module 2130 may include defense circuits according to exemplary embodiments of the inventive concept described with reference to FIGS. 1 to 9. The defense circuit may sense light, penetrating from the outside of the security module 2130, to detect whether a physical attack has occurred, irrespective of an operating temperature. When the defense circuit detects a physical attack, the security module 2130 may block the transmission of command data from the first processor 2110 to the second processor 2120.

The first communications module 2200 and the second communications module 2300 may communicate with other electronic devices inside or outside of the vehicle in a wired or wireless communication manner. For example, the first communications module 2200 may communicate with an external electronic device, and the second communications module 2300 may communicate with other electronic devices inside of the vehicle.

The first communications module 2200 may include, for example, a Wi-Fi module 2210, a Bluetooth module 2220, a cellular communications module 2230, and the like. The vehicle system 2000 may perform short-range wireless communication with an external mobile device using the Wi-Fi module 1121 or the Bluetooth module 2220. In addition, the vehicle system 2000 may perform wireless communication with an external server using the cellular communications module 2230. The cellular communications module 2230 may perform communication according to communication standards such as standards of Institute of Electrical and Electronics Engineers (IEEE), 3rd Generation (3G), 3rd Generation Partnership Project (3GPP), or Long-Term Evolution (LTE).

The second communications module 2300 may include, for example, a K-Line communications module 2310, an RS-232 communications module 2320, and a CAN communications module 2330. The second communications module 2300 may perform wired communication with other electronic devices inside of the vehicle, using the K-Line communications module 2310 or the like.

The sensor module 2400 may include various sensors for detecting a state of the vehicle system 2000 and a state of the vehicle. For example, the sensor module 2400 may include an acceleration sensor, a gyro sensor, an illumination sensor, a proximity sensor, a pressure sensor, a noise sensor, a video sensor, a temperature sensor, a shock sensor, or the like.

The sensor module 2400 may detect a state of charge of a battery, a temperature, a moving speed of the vehicle, whether an impact has occurred in a vehicle, an operating state of the vehicle system 2000 itself, etc., using various sensors.

The memory 2500 may store various types of software and data, executed and processed in the vehicle system 2000, and may include at least one of a volatile memory and a nonvolatile memory. For example, the memory 2500 may store the status information of the vehicle or the vehicle system 2000. In addition, the memory 2500 may store a list of external devices which may exchange data.

Figure 13:
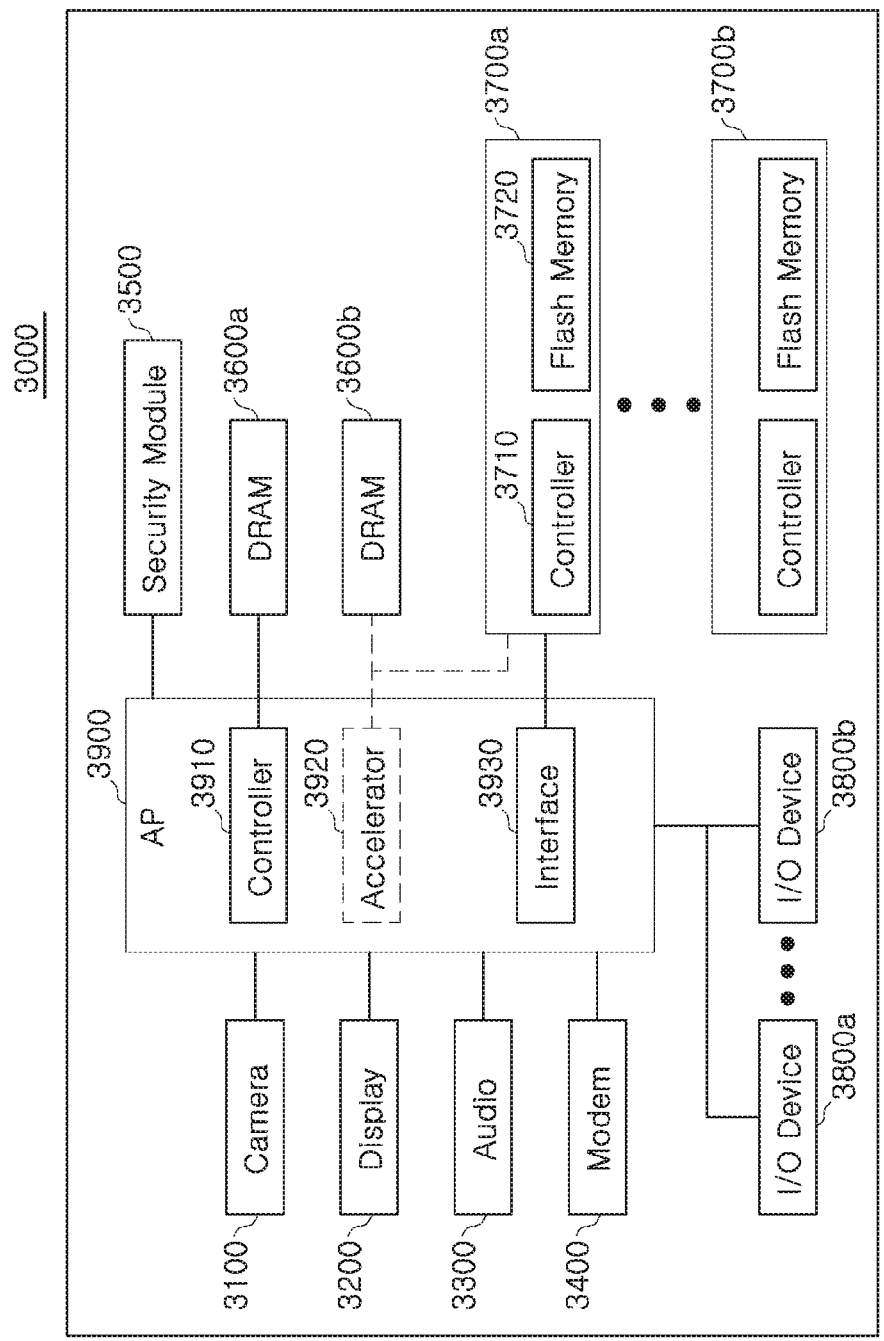
FIG. 13 is a block diagram of a server device including a defense circuit according to an exemplary embodiment of the inventive concept.

FIG. 13 is a block diagram of a server device including a defense circuit according to an exemplary embodiment of the inventive concept.

Referring to FIG. 13, a mobile system 3000 according to an exemplary embodiment of the inventive concept may include a camera 3100, a display 3200, an audio processing unit 3300, a modem 3400, DRAMs 3600*a* and 3600*b*, flash memory devices 3700*a* and 3700*b*, input/output (I/O) devices 3800*a* and 3800*b*, and an application processor (AP) 3900.

The mobile system 3000 may be implemented as a laptop computer, a mobile phone, a smartphone, a tablet personal computer (PC), a wearable device, a healthcare device, an Internet-of-Things (IoT) device, or the like. Additionally, the mobile system 2000 may be implemented as a server or a PC.

The camera 3100 may take a still image or a video under a user's control. The mobile system 3000 may obtain specific information using a still image/video taken by the camera 3100, or may convert and store the still image/video into other types of data such as text. Alternatively, the mobile system 3000 may recognize a character string included in the still image/video taken by the camera 3100, and may provide a text or audio translation corresponding to the character string. As described above, the camera 3100 in the mobile system 3000 tends to be used in various fields of application. In exemplary embodiments of the inventive concept, the camera 3100 may transmit data such as still image/video to the AP 3900 according to a D-PHY or C-PHY interface defined in the MIPI Standard.

The display 3200 may be implemented in various forms such as a liquid crystal display (LCD), an organic light emitting diode (OLED) display, an active-matrix organic light emitting diode (AMOLED) display, a plasma display panel (PDP), a field emission display (FED), an electronic paper, or the like. In an exemplary embodiment of the inventive concept, the display 3200 may provide a touch-screen function to be also used as an input device of the mobile system 3000. In addition, the display 3200 may be integrated with a fingerprint sensor or the like, to provide a security function for the mobile system 3000. The AP 3900 may transmit image data, to be displayed on the display 3200, to the display 3200 according to a D-PHY or C-PHY interface defined in the MIPI Standard.

The audio processing unit 3300 may process audio data, stored in the flash memory devices 3700a and 3700b, or audio data included in contents externally received through the modem 3400 or the I/O devices 3800a and 3800b. For example, the audio processing unit 3300 may perform various processes such as encoding/decoding, amplification, noise filtering, or the like, on the audio data.

The modem 3400 may modulate a signal and transmit the modulated signal to transmit and receive wired/wireless data, and may demodulate an externally received signal to restore an original signal.

The I/O devices 3800a and 3800b may provide digital input and output, and may include an input device, such as a port connectable to an external recording medium, a touchscreen, or a mechanical button key, and an output device capable of outputting a vibration in a haptic manner. In certain examples, the I/O devices 3800a and 3800b may be connected to an external recording medium through a port such as a USB, a lightning cable, a Secure Digital (SD) card, a micro SD card, a DVD, a network adapter, or the like.

The AP 3900 may control the overall operation of the mobile system 3000. For example, the AP 3900 may control the display 3200 to display a portion of the contents, stored in the flash memory devices 3700a and 3700b, on a screen. In addition, the AP 3900 may perform a control operation corresponding to a user input when the user input is received through the I/O devices 3800a and 3800b.

The AP 3900 may be provided as a system-on-chip (hereinafter referred to as "SoC") driving an application program, an operating system (OS), or the like. In addition, the AP 3900 may be included in a single semiconductor package together with other devices included in the mobile system 3000, for example, the DRAMs 3600a and 3600b, a flash memory 3720 (included in the flash memory devices 3700a and 3700b), and/or a controller 3710 (included in the flash memory devices 3700a and 3700b). For example, the AP 3900 and at least one device may be provided in a package form such as Package on Package (PoP), Ball Grid Arrays (BGAs), Chip Scale Packages (CSPs), System In Package (SIP), Multi Chip Package (MCP), Wafer-level Fabricated Package (WFP), Wafer-Level Processed Stack Package (WSP), or the like. A kernel of the operating system, driven on the AP 3900, may include an input/output scheduler and a device driver for controlling the flash memory devices 3700a and 3700b. The device driver may control access performance of the flash memory devices 3700a and 3700b with reference to the number of synchronous queues managed by the input/output scheduler, or may control a CPU mode inside the SoC, a dynamic voltage and frequency scaling (DVFS) level, or the like.

In exemplary embodiments of the inventive concept, the AP 3900 may include a processor block, executing an operation or driving an application program and/or an operating system, and various other peripheral elements connected to the processor block through a system block and a system bus. The peripheral elements may include a memory controller, an internal memory, a power management block, an error detection block, a monitoring block, or the like. The processor block may include one or more cores. When a plurality of cores are included in the processor block, each of the cores includes a cache memory, and a common cache, shared by the cores, may also be included in the processor block.

In exemplary embodiments of the inventive concept, the AP 3900 may include an accelerator block 3920, a specific-purpose circuit for AI data operation. Alternatively, according to exemplary embodiments of the inventive concept, a separate accelerator chip may be provided to be separated from the AP 3900, and the DRAM 3600b may be additionally connected to the accelerator block 3920 or the accelerator chip. The accelerator block 3920 may be a functional block specialized in performing specific functions of the AP 3900, and may include a graphic processing unit (GPU) serving as a functional block specialized in processing graphics data, a neural processing unit (NPU) serving as a functional block specialized in performing AI computation and inference, a data processing unit (DPU) serving as a functional block specialized in transmitting data, or the like.

According to exemplary embodiments of the inventive concept, the mobile system 3000 may include a security module 3500 for storing confidential information. The security module 3500 may store an authentication key, an encryption code, or the like. The security module 3500 may be a semiconductor device including a defense circuit according to exemplary embodiments of the inventive concept described with reference to FIGS. 1 to 9. The defense circuit mounted on the security module 3500 may detect light, penetrating into the security module 3500, to detect whether an external attack has occurred. The defense circuit mounted on the security module 3500 may generate leakage current depending on an ambient temperature, and may include a semiconductor element having substantially the same characteristics as the light sensing element to more accurately detect whether an external attack has occurred, based on only the light penetrating into the security module 3500.

In exemplary embodiments of the inventive concept, when a physical attack has occurred on the security module 3500, the security module 3500 may perform predetermined defense operations such as data initialization, data scrambling, data output blocking, or the like. The defense operations of the security module 3500 may be internally performed based on a detection result of the defense circuit. In addition, the defense operations of the security module 3500 may be performed under the control of the AP 3900 based on the detection result of the defense circuit.

According to exemplary embodiments of the inventive concept, the mobile system 3000 may include a plurality of DRAMs 3600a and 3600b. In exemplary embodiments of the inventive concept, the AP 3900 may include a controller 3910 for controlling the DRAMs 3600a and 3600b, and the DRAM 3600a may be directly connected to the AP 3900.

The AP 3900 may set a command and a mode register set (MRS) command according to the JEDEC standards to control a DRAM, or may set specifications and functions required by the mobile system 3000, such as a low voltage, high speed, and reliability, and a DRAM interface protocol for CRC/ECC to perform communication. For example, the AP 3900 may communicate with the DRAM 3600a through an interface, conforming to the JEDEC standards, such as LPDDR4, LPDDR5, or the like. Alternatively, the AP 3900 may set a new DRAM interface protocol to control the DRAM 3600b for an accelerator, in which the accelerator block 3920 or an accelerator chip provided independently of the AP 3900 has a higher bandwidth than the DRAM 3600b, to perform communication.

Only the DRAMs 3600a and 3600b are illustrated in FIG. 13, but a configuration of the mobile system 3000 is not necessarily limited thereto. According to bandwidth and reaction speed of the AP 3900 or the accelerator block 3920, voltage conditions, or the like, memories other than the DRAMS 3600a and 3600b may also be included in the mobile system 3000. As an example, the controller 3910 and/or the accelerator block 3920 may control various memories such as phase-change random access memory (PRAM), static RAM (SRAM), magnetic RAM (MRAM), resistive RAM (RRAM), ferroelectric RAM (FRAM), Hybrid RAM, or the like. The DRAMs 3600*a* and 3600*b* have relatively lower latency and higher bandwidth than the I/O devices 3800*a* and 3800*b* or the flash memory devices 3700*a* and 3700*b*. The DRAMs 3600*a* and 3600*b* may be initialized at a point in time when the mobile system 3000 is powered on. When an operating system and application data are loaded, the DRAMs 3600*a* and 3600*b* may be used as temporary storages, in which the operating system and application data are temporarily stored, or as spaces in which various software codes are executed.

Four fundamental arithmetic operations such as addition, subtraction, multiplication, and division, and a vector operation, an address operation, or Fast Fourier Transform (FFT) operation data may be stored in the DRAMs 3600*a* and 3600*b*. In an exemplary embodiment of the inventive concept, the DRAMs 3600*a* and 3600*b* may be provided as a processing in memory (PIM) having an operational function. As an example, a function used in inference may be performed in the DRAMs 3600*a* and 3600*b*. In this case, the inference may be performed in a deep learning algorithm using an artificial neural network. The deep learning algorithm may include a training step, in which a model is learned through various data, and an inference step in which data is recognized with the trained model. For example, a function used in the inference may include a hyperbolic tangent function, a sigmoid function, a rectified linear unit (ReLU) function, or the like.

According to an exemplary embodiment of the inventive concept, an image taken by a user through the camera 3100 may be signal-processed and stored in the DRAM 3600*b*, and the accelerator block 3920 or the accelerator chip may perform an AI data operation using the data stored in the DRAM 3600*b* and the function used in the inference to recognize data.

According to exemplary embodiments of the inventive concept, the mobile system 3000 may include a plurality of storages or a plurality of flash memory devices 3700*a* and 3700*b* having a capacity higher than a capacity of the DRAMs 3600*a* and 3600*b*.

The flash memory devices 3700*a* and 3700*b* may include the controller 3710 and the flash memory 3720. The controller 3710 may receive a control command and data from the AP 3900, and may write data to the flash memory 3720 in response to the control command or may read data stored in the flash memory 3720 and transmit the read data to the AP 3900.

According to an exemplary embodiment of the inventive concept, the accelerator block 3920 or the accelerator chip may perform a training step and an AI data operation using the flash memory devices 3700*a* and 3700*b*. In exemplary embodiments of the inventive concept, a block capable of performing a predetermined operation may be implemented in the flash memory devices 3700*a* and 3700*b*. Instead of the AP 3900 and/or the accelerator block 3920, the implemented block may perform at least a portion of the training step and the AI data operation, performed by the AP 3900 and/or the accelerator block 3920, using the data stored in the flash memory 3720.

In exemplary embodiments of the inventive concept, the AP 3900 may include an interface 3930. Accordingly, the flash memory devices 3700*a* and 3700*b* may be directly connected to the AP 3900. For example, the AP 3900 may be implemented as an SoC, the flash memory device 3700*a* may be implemented as a chip independently of the AP 3900, and the AP 3900 and the flash memory device 3700*a* may be mounted in a single package. However, the inventive concept is not limited thereto, and the plurality of flash memory devices 3700*a* and 3700*b* may be electrically connected to the mobile system 3000 through a connection.

The flash memory devices 3700*a* and 3700*b* may store data such as a still image/video, taken by the camera 3100, or data received through a communications network and/or ports included in the I/O devices 3800*a* and 3800*b*. For example, the flash memory devices 3700*a* and 3700*b* may store augmented reality/virtual reality, high definition (HD), or ultra high definition (UHD) content.

As described above, a defense circuit of a semiconductor device according to exemplary embodiments of the inventive concept may sense light, penetrating into the semiconductor device, to determine whether a physical attack has occurred.

In addition, a defense circuit of a semiconductor device according to exemplary embodiments of the inventive concept may determine whether a physical attack has occurred using only photocurrent and excluding leakage current that depends on an ambient temperature, and thus, may further improve physical attack detection accuracy.

Furthermore, a defense circuit of a semiconductor device according to exemplary embodiments of the inventive concept may be implemented with a plurality of modules, distributed in the semiconductor device, to further improve physical attack detection accuracy.

While the inventive concept has been shown and described above with reference to exemplary embodiments thereof, it will be apparent to those of ordinary skill in the art that modifications and variations in form and details could be made thereto without departing from the spirit and scope of the inventive concept as set forth by the appended claims.

What is claimed is:

1. A semiconductor device comprising:
   a sensing circuit including a first semiconductor element configured to generate a first current in response to externally incident light;
   a compensation circuit including a second semiconductor element configured to generate a second current depending on an ambient temperature, wherein the compensation circuit is configured to remove the second current from the first current to generate a third current;
   a detection circuit configured to convert the third current into a photovoltage and to compare the photovoltage with a predetermined reference voltage to determine whether an external attack has occurred; and
   a defense circuit configured to control the semiconductor device to perform a predetermined defense operation, based on a result of the determination.

2. The semiconductor device of claim 1, wherein a reverse bias voltage, applied to the first semiconductor element, has substantially the same level as a reverse bias voltage applied to the second semiconductor element.

3. The semiconductor device of claim 1, wherein the second semiconductor element has substantially the same characteristics as the first semiconductor element and is disposed adjacent to the first semiconductor element.

4. The semiconductor device of claim 3, wherein the compensation circuit further includes an optical shielding layer blocking the externally incident light.

5. The semiconductor device of claim 3, wherein the compensation circuit further includes an input resistor connected between a power supply node configured to supply a power supply voltage and the second semiconductor element.

6. The semiconductor device of claim 1, wherein the first semiconductor element includes a plurality of photosensitive elements, and
the first current corresponds to an average of photocurrents generated by the plurality of photosensitive elements.

7. The semiconductor device of claim 1, wherein the first semiconductor element includes a plurality of photosensitive elements, and
the detection circuit determines whether the external attack has occurred, based on photocurrents generated by the plurality of photosensitive elements.

8. The semiconductor device of claim 1, wherein the external attack includes a de-packaging attack on the semiconductor device.

9. The semiconductor device of claim 1, wherein the sensing circuit, the compensation circuit, the detection circuit, and the defense circuit are included in a single semiconductor chip.

10. The semiconductor device of claim 1, wherein the sensing circuit, the compensation circuit, and the detection circuit are included in a first semiconductor chip, and the defense circuit is included in a second semiconductor chip, and
the first semiconductor chip and the second semiconductor chip are separate.

11. A defense circuit of a semiconductor device, the defense circuit comprising:
a first diode connected to a first node;
a second diode connected to a second node;
an input resistor connected between a power supply node configured to supply a power supply voltage and the second node;
a first operational amplifier having the first node as an inverting input node and the second node as a non-inverting input node; and
a second operational amplifier having an output node of the first operational amplifier as a non-inverting input node,
wherein the first operational amplifier includes a feedback resistor connected between the first node and the output node of the first operational amplifier.

12. The defense circuit of claim 11, wherein a voltage level of the first node is substantially the same as a voltage level of the second node.

13. The defense circuit of claim 12, wherein the voltage level of the first node and the voltage level of the second node are in inverse proportion to an operating temperature of the defense circuit.

14. The defense circuit of claim 11, wherein a level of an operating voltage of each of the first operational amplifier and the second operational amplifier is higher than a level of the power supply voltage.

15. The defense circuit of claim 11, wherein the feedback resistor has substantially the same resistance as the input resistor.

16. A defense circuit of a semiconductor device, the defense circuit comprising:
a sensing circuit including a first semiconductor element configured to generate a first current based on externally incident light and an ambient temperature;
a compensation circuit configured to remove current depending on the ambient temperature from the first current to generate a second current;
a first operational amplifier configured to output a photovoltage corresponding to the second current; and
a second operational amplifier configured to compare the photovoltage with a predetermined reference voltage to generate a comparison result, and to output an event signal indicating whether an external attack has occurred based on the comparison result,
wherein the compensation circuit includes a second semiconductor element having substantially the same characteristics as the first semiconductor element and is disposed adjacent to the first semiconductor element, and
a level of a reverse bias voltage applied to the first semiconductor element is substantially the same as a level of a reverse bias voltage applied to the second semiconductor element.

17. The defense circuit of claim 16, wherein the event signal is a voltage signal having a logic high level when the external attack has occurred and having a logic low level when the external attack does not occur.

18. The defense circuit of claim 16, wherein a level of the predetermined reference voltage is in proportion to sizes of the first and second semiconductor elements.

19. The defense circuit of claim 16, wherein the first semiconductor element is connected to an inverting input node of the first operational amplifier, and the second semiconductor element is connected to a non-inverting input node of the first operational amplifier.

20. The defense circuit of claim 16, wherein the first semiconductor element and the second semiconductor element are commonly connected to an inverting input node of the first operational amplifier.

* * * * *